United States Patent [19]

Lutzer

[11] Patent Number: 5,794,888
[45] Date of Patent: Aug. 18, 1998

[54] SYSTEM FOR REMOVING INCIDENT HEAT FROM AIRCRAFT DURING FLIGHT

[75] Inventor: Wilhelm Lutzer, Hamburg, Germany

[73] Assignee: Daimler-Benz Aerospace Airbus GmbH, Hamburg, Germany

[21] Appl. No.: 751,055

[22] Filed: Nov. 15, 1996

[30] Foreign Application Priority Data

Nov. 17, 1995 [DE] Germany .................. 195 42 843.9

[51] Int. Cl.[6] .................................................. B69C 1/00
[52] U.S. Cl. ................... 244/117 A; 244/121; 244/124
[58] Field of Search ................... 244/117 A, 120, 244/121, 124, 135 C, 158 A

[56] References Cited

U.S. PATENT DOCUMENTS

| | | | |
|---|---|---|---|
| 3,015,461 | 1/1962 | Fineblum | 244/117 A |
| 4,057,104 | 11/1977 | Altoz | 244/117 A |
| 4,273,304 | 6/1981 | Frosch et al. | 244/117 A |
| 4,275,857 | 6/1981 | Bergsten | 244/117 A |
| 5,149,018 | 9/1992 | Clark | 244/117 A |
| 5,667,168 | 9/1997 | Fluegel | 244/117 A |

*Primary Examiner*—Virna Lissi Mojica
*Attorney, Agent, or Firm*—W. G. Fasse; W. F. Fasse

[57] ABSTRACT

The invention relates to a system for removing the heat that is incident upon an aircraft, and especially a supersonic aircraft, during flight. The incident heat is generated by the constant heating effect of aerodynamic friction on the outer skin of the fuselage, by compression heating at the ram or stagnation point and stagnation edges of the aircraft fuselage, and by the heating of external air as it is compressed to cabin pressure. In the present system, the used cabin air is exhausted out of the cabin through a space between the cabin interior panels and the fuselage outer skin, where the airflow absorbs the heat incident through the outer skin and is heated to approximately the temperature of the outer skin. Next, the heated airflow is preferably first filtered through a filter and is then expanded and cooled through an expansion turbine. The output shaft of the turbine can drive a generator to recover useful electrical energy. The cooled and expanded airflow is directed through hollow spaces located between the wing fuel tanks and the underside of the associated wing, to absorb and remove heat incident on the lower surface of the wings. In this manner, the system removes at least a portion of the heat incident on the outer skin of the fuselage and the wings, before the heat reaches the aircraft cabin or the fuel in the fuel tanks, respectively.

22 Claims, 1 Drawing Sheet

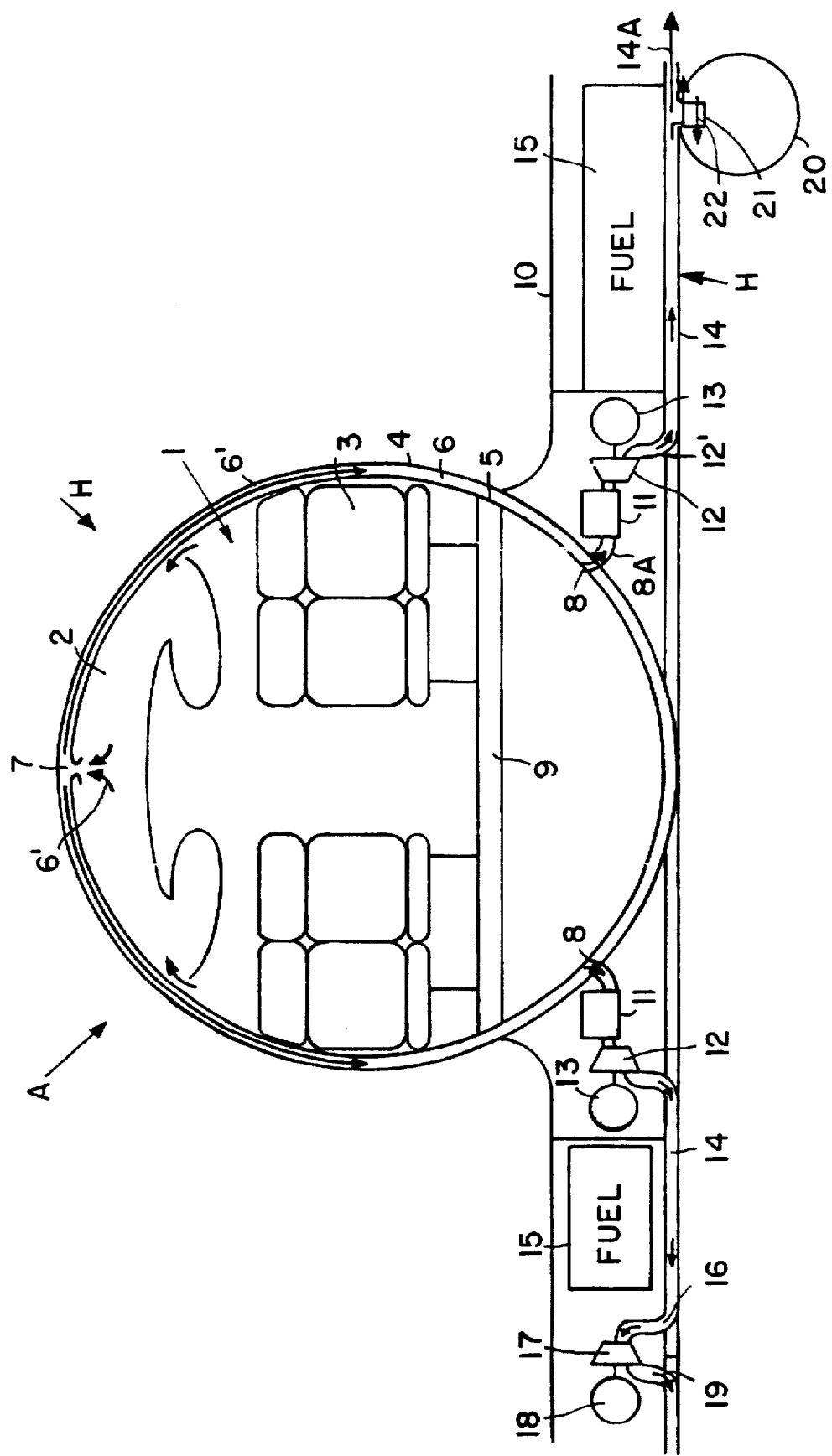

SYSTEM FOR REMOVING INCIDENT HEAT FROM AIRCRAFT DURING FLIGHT

FIELD OF THE INVENTION

The invention relates to a system for removing or reducing the amount of heat that is generated and incident into an aircraft, and especially a supersonic aircraft, during flight. The incident heat is generated by the constant heating effect of aerodynamic friction of the outer skin of the aircraft passing through the surrounding air, by compression heating at the ram or stagnation point and stagnation edges of the aircraft fuselage, by solar heating of the fuselage, and by the compression heating of external air as it is compressed to the cabin pressure for purposes of climate control, e.g. air conditioning, of the cabin. In the present system, the used or spent cabin air is exhausted out of the cabin through a space between the cabin interior panels and the fuselage outer skin of the aircraft, so that the airflow absorbs the heat incident through the fuselage outer skin and becomes heated to approximately the temperature of the fuselage outer skin.

BACKGROUND INFORMATION

In contrast to subsonic aircraft, supersonic aircraft undergo a constant and significant heating during flight, due to the aerodynamic friction of the surface of the aircraft passing through the surrounding air, and due to compression heating at the stagnation point and at stagnation edges. In addition to the heat generated at and transferred from the outer skin of the aircraft fuselage, a considerable quantity of heat arises in an aircraft cabin when the external air is compressed to cabin pressure for purposes of climate control, e.g. air conditioning. In order to maintain a tolerable cabin temperature, this heat must be absorbed before it reaches the cabin.

By virtue of its high specific heat capacity, the fuel on board the aircraft is suitable as a heat sink for absorbing at least some of the heat that would affect the cabin, and also for removing this heat from the aircraft as the fuel is consumed, i.e. burned by the engines. However, because the fuel is stored in the large wings, which are also particularly flat in supersonic aircraft, the fuel is also directly heated by the frictional heating of the outer skin of the wings. For this reason, the fuel provided for combustion becomes ever warmer and thus has an ever-decreasing remaining capacity for absorbing and removing heat as the flight time increases. Moreover, as the stored fuel is burned, and thus the remaining fuel volume decreases, the total heat absorption and removal capacity of the remaining fuel also decreases.

It is known to thermally insulate the wings using an insulating material, and thereby reduce the above mentioned heating of the fuel through the frictional heating of the wing surfaces.

OBJECTS OF THE INVENTION

In view of the above it is the aim of the invention to achieve the following objects singly or in combination:

to provide a system for reducing the amount of heat coupled or incident into an aircraft during flight, by which at least a portion of the heat incident through the outer skin of the aircraft can be removed before it reaches and thus heats the aircraft cabin and the fuel stored within the wings;

to recover useful energy from the excess heat arising from frictional heating, solar heating, and compression heating, for example to provide electricity for use on board the aircraft;

to recover useful energy from the pressure of the pressurized cabin air that is to be exhausted overboard;

to provide an effective alternative cooling medium for cooling compressed bleed air tapped from the jet engines;

to construct such a system in a light-weight, simple and cost-economical manner that can be easily installed in new aircraft or retrofit into existing aircraft; and to improve the overall energy consumption and performance efficiency of an aircraft using such a system.

SUMMARY OF THE INVENTION

The above objects have been achieved in a system for removing heat generated in aircraft during flight, according to the invention, wherein used cabin air is exhausted from the cabin through air channels or spaces between the cabin interior panels and the fuselage outer skin, whereby the air absorbs heat from the fuselage skin, and is then directed through at least one turbine in which the air is depressurized or expanded and cooled. Further according to the invention, the expanded and cooled cabin exhaust air is then directed through air channels or hollow spaces in the wing located between the fuel tanks and the underside of the wing, in order to absorb and remove heat that is incident through the lower surface or underside of the wing. In this manner, heat generated or incident on the outer skin of the aircraft fuselage is absorbed and removed before it heats up the aircraft cabin or the fuel in the fuel tanks.

The invention further provides filter assemblies for filtering the cabin exhaust air. The filter assemblies are arranged upstream of the expansion turbine or turbines, and are preferably arranged downstream of the hollow spaces through which the used cabin air flows between the fuselage skin and the cabin interior panels. According to the invention, the expansion turbine or turbines are so arranged and operated as to expand and cool the used cabin air to the extent necessary for achieving the desired reduction or removal of excess heat incident into the aircraft. Advantageously, one or more generators can be connected to respective output shafts of the expansion turbine or turbines, for producing electricity from the energy that has been recovered through the expansion and cooling of the airflow.

The invention provides several different embodiments for handling the cabin exhaust air after it has been expanded and cooled through the expansion turbine and then passed through the hollow spaces between the fuel tanks and the underside of the wing. In one embodiment, after the airflow has absorbed heat that is transferred from the underside of the wing, the air is released or exhausted directly overboard to the environment outside of the aircraft. According to another embodiment of the invention, the cabin air exiting from the hollow spaces is used as a cooling medium in a tap air cooler for cooling tap or bleed air that is bled from the compressor stages of the engine.

Still another embodiment of the invention applies in the case in which the cooled expanded cabin air is unable to absorb all of the heat incident through the surfaces of the wing, since the air has already been heated to approximately the temperature of the outer surface before it reaches the end of the wing. In these situations, the invention provides that the cabin air that has flowed through the hollow spaces and has thus absorbed the heat incident from the underside of the wing is then expanded and cooled a second time. Thereafter, the once-again expanded and cooled air is directed through corresponding hollow spaces to absorb and remove additional heat incident from the underside of the wing. For this purpose, the invention provides appropriate airflow channels and additional or secondary expansion turbines as necessary.

BRIEF DESCRIPTION OF THE DRAWINGS

In order that the invention may be clearly understood, it will now be described, by way of example, with reference to the single drawing Figure, which shows a section through the fuselage of an aircraft comprising the system according to the invention, along a section plane passing through the wings.

DESCRIPTION OF PREFERRED EXAMPLE EMBODIMENTS AND OF THE BEST MODE OF THE INVENTION

As shown in the drawing Figure, an aircraft A equipped with a system according to the invention has a fuselage outer skin 4 enclosing an aircraft cabin 1 in which passenger facilities such as baggage compartments and passenger seats 3 are arranged. An interior space 2 of the cabin 1 is bounded by a cabin floor 9 at the bottom, and by cabin interior panels 5 at the sides and the top thereof. The cabin interior panels 5 are mounted on the fuselage or on the fuselage outer skin with a predefined spacing forming interspaces 6 between the outer skin 4 and the cabin interior panels 5. The interspaces 6 form air channels that comprise simple open passages or air ducts through which air may flow, preferably in direct thermal contact with the fuselage outer skin 4. Cabin air outlet openings 7 pass through the cabin interior panels 5, preferably near the top or ceiling of the cabin 1, to connect the interior space 2 of the cabin 1 with the interspaces or air channels 6. As represented by arrows 6', the cabin air to be exhausted, which is generally warm cabin air, flows from the cabin interior space 2 through the openings 7 into the interspaces 6. When the openings 7 are arranged near the top of the cabin as shown, it is especially the warmest cabin air that is exhausted therethrough.

As the airstream or airflow 6' flows through the channels or interspaces 6, it absorbs heat (symbolized by the arrow H) that is incident upon the fuselage outer skin 4, and thereby the airflow 6' becomes further heated. The heated, exhausted cabin airflow 6' flows downward through the interspaces 6 and exits through outlet openings 8 provided through the fuselage outer skin 4, for example below the floor 9 in the area of the wing roots of the wings 10.

Filter assemblies 11 are arranged preferably within the wings 10, and especially in the area of the wing roots, and are connected to the air outlet openings 8 by suitable air ducts 8A. Alternatively, the filter assemblies 11 can be located at any other convenient location. An outlet of each filter assembly 11 is respectively connected to the inlet of an expansion turbine 12, through which the heated and filtered airflow 6' is expanded and cooled. It should be understood that one turbine 12 can be respectively provided for each filter assembly 11, or a plurality of filter assemblies 11 can be connected by an appropriate air manifold to a single turbine 12 on each side, i.e. in each wing 10, of the aircraft. The work output shaft of each turbine 12 can be used to perform mechanical work, such as driving a fluid pump or the like, or preferably is connected to an electrical generator 13 for generating electricity to be used by other equipment on board the aircraft.

The expanded and cooled airflow 6' exits the expansion turbine 12 and flows through air ducts 12' into hollow spaces forming air channels 14 located between the underside of the wing 10 and the fuel tanks 15 that are arranged within the wings 10. The air channels 14 may comprise simple open passages or may comprise appropriate air duct members. Preferably the airflow 6' flows in direct thermal contact with the underside or bottom of the wing 10. Heat generated by air friction on the underside of the wing 10 is absorbed and removed by the air flowing through the hollow spaces 14 before it can heat the fuel.

The heated airflow 6' can be exhausted from the air channels 14 directly overboard to the outside environment through an outlet 14A. Alternatively, or additionally, at least a portion of the airflow 6' can be used as a coolant medium in a tap air cooler 21 to cool compressed air 22 that is tapped or bled from a jet engine 20. The cooler 21 has a first flow passage connected to the compressed air bleed tap and a second flow passage connected to the outlet of the air channel 14.

As also shown in the drawing Figure, the invention optionally provides a secondary expansion and cooling of the heated airflow 6'. Namely, after the airflow id passes through the hollow spaces 14 and thereby absorbs heat, the heated airflow is directed through another expansion turbine where it is expanded and cooled. Then, the airflow, which now has been expanded and cooled two times, is paused through further hollow spaces 14 to absorb and remove additional heat from the underside of the wing. This embodiment is used in situations in which a single passthrough of the cabin exhaust airflow cannot absorb and remove a sufficient quantity of incident heat.

After even a short period of supersonic flight, generally enough fuel will have been consumed that a layer of air is formed between the fuel surface and the top of the tank, which is formed top skin of the wings for example. This air layer has an insulating effect. Thus, advantageously only the pan or areas of the tank in which the fuel is in direct contact with the tank wall or with the insulation thereof need to be cooled. In conventional wing and tank designs, these tank areas are at the underside of the wing 10, and therefore the invention preferably provides the hollow spaces or airflow channel 14 only between the bottom of the tank 15 and the bottom surface of the wing 10.

Calculations have been carried out in an investigation for estimating the required cooling capacity and as a basis for a rough or approximate calculation of the removable heat. This investigation represented or considered the various heating loads and two different climate control or air conditioning concepts with different air flow requirements. In this example, 33.6 kilowatts (kW) of heat was generated or coupled into the fuselage outer skin of an aircraft, including 19,700 W of heat generated by aerodynamic friction on the cabin portion of the fuselage, 6,400 W of heat from solar radiation onto the cabin fuselage, and 7,500 W of heat from aerodynamic friction on the freight compartment portion of the fuselage.

Due to this incident heat, the air inside the fuselage will be heated according to the following equation:

$$\Delta T = \dot{Q}/(\dot{m}*cp) \qquad \text{Equation (1)}$$

wherein $\dot{Q}$=heat flow (kW), $\dot{m}$=mass flow (kg/s), and cp=specific heat (kJ/kg K). For a cp value of approximately 1, assuming an initial cabin exhaust air temperature of 30° C., and with a prescribed mass flow, i.e. air flow rate, of $\dot{m}_1$=2.38 Kg/s for the first climate control condition or $\dot{m}_2$=1.45 kg/s for the second climate control condition, the air within the fuselage, after flowing along the fuselage outer skin, will reach a temperature of 44° C. or 53° C. respectively.

It this heated air is expanded through the turbine 12, then simultaneously the temperature of the air will be lowered and energy can be recovered in the form of mechanical energy or electrical energy via a generator 13. To avoid the danger of icing, the expansion of the air should be limited to produce final temperatures above 0° C. If 5° C. is therefore assumed as the lower temperature limit, the useful recoverable energy, or rather power P in given by the following equation:

$$P = \dot{m} * cp * \Delta T \quad \text{Equation (2)}$$

Thus, with $\Delta T = 39°$ C. (=39 K) and $\dot{m}_1 = 2.38$ kg/s, and cp=1, the recoverable power P=93 kW according to the first climate control condition. Alternatively, with $\Delta T = 48°$ C. (=48 K) and $\dot{m}_2 = 1.45$ kg/m, and cp=1, the recoverable power P=70 kW in the second climate control condition.

Next, the capacity of the dead air to absorb heat, namely the heat flow $\dot{Q}$ for the expanded airflow through the hollow spaces 14 in the wing is given by the equation:

$$\dot{Q} = \dot{m} * cp * \Delta T \quad \text{Equation (3)}$$

In the present example, it in assumed that the air may be heated to a maximum temperature of 80° C. at a corresponding skin temperature of 95° C., whereby $\Delta T = (80-S)°C = 75$ K, resulting in $\dot{Q}_1 = 179$ kW for the climate control condition, and $\dot{Q}_2 = 109$ kW for the second climate control condition.

On the other hand, an estimate of the heat incident on the wing 10, namely the heat flow $\dot{Q}_W$ can be calculated according to the equation:

$$\dot{Q}_W = A * k * \Delta T \quad \text{Equation (4)}$$

wherein A is the surface area of the wing being heated, and k is the heat transfer coefficient. In the present example, the wing surface area A=836 m$^2$, the heat transfer coefficient k=0.005 kW/m$^2$K, and the average temperature difference $\Delta T = 525$ K, so that the total incident heat flow $\dot{Q}_W$ according to the above Equation (4) is 217 kW.

As a result of the above calculations, it can be seen that the example embodiments of a system according to the invention provide a significant amount of useable power (derived from the excess heat of the cabin exhaust air, further heated by the incident heat on the fuselages), and also manage to absorb and remove the entire heat load incident on the cabin and freight compartment fuselage, and at least half or even most of the heat incident on the wing. If additional heat removal from the wings is desired, the secondary expansion, cooling and recirculation of the exhaust airflow can be used as described above.

Although the invention has been described with reference to specific example embodiments, it will be appreciated that it is intended to cover all modifications and equivalents within the scope of the appended claims.

What is claimed is:

1. In an aircraft having a fuselage with an outer skin, at least one cabin interior panel arranged in said fuselage to bound a pressurized cabin in said aircraft, and a wing extending from said fuselage; an improved system for removing from said aircraft heat generated by at least one of aerodynamic friction heating of said fuselage outer skin, compression heating at a stagnation point and a stagnation edge of said fuselage outer skin, compression heating of cabin air that is compressed to a pressure level of said pressurized cabin, and solar heating of said fuselage outer skin;

wherein said improved system for removing heat comprises a first air channel between said cabin interior panel and said fuselage outer skin, a cabin air exhaust outlet opening through said cabin interior panel into said first air channel to enable an airflow to flow from said pressurized cabin into and along said first air channel, a first air channel outlet arranged to allow said airflow to flow out of said first air channel, an expansion turbine having an air inlet and an air outlet, with said air inlet connected to said first air channel outlet, and a second air channel arranged in said wing along a bottom of said wing and having a second air channel inlet and a second air channel outlet, with said second air channel inlet connected to said expansion turbine air outlet.

2. The improved system for removing heat according to claim 1, wherein said aircraft is a supersonic aircraft.

3. The improved system for removing heat according to claim 1, further comprising an air filter connected to said first air channel.

4. The improved system for removing heat according to claim 3, wherein said air filter is interposed between said first air channel outlet and said expansion turbine air inlet.

5. The improved system for removing heat according to claim 4, wherein said aircraft further includes a fuel tank arranged in said wing, and wherein said second air channel is arranged between a bottom of said fuel tank and said bottom of said wing.

6. The improved system for removing heat according to claim 1, wherein said aircraft further includes a fuel tank arranged in said wing, and wherein said second air channel is arranged between a bottom of said fuel tank and said bottom of said wing.

7. The improved system for removing heat according to claim 6, wherein said first air channel is arranged to put said airflow in direct thermal contact with said fuselage outer skin, and said second air channel is arranged to put said airflow in direct thermal contact with said bottom of said wing.

8. The improved system for removing heat according to claim 6, wherein said second air channel comprises an open air space formed directly between said bottom of said fuel tank and said bottom of said wing.

9. The improved system for removing heat according to claim 1, wherein said first air channel is arranged to put said airflow in direct thermal contact with said fuselage outer skin, and said second air channel is arranged to put said airflow in direct thermal contact with said underside of said wing.

10. The improved system for removing heat according to claim 1, wherein said first air channel comprises an open air space formed directly between said cabin interior panel and said fuselage outer skin.

11. The improved system for removing heat according to claim 1, wherein said first air channel and said second air channel each respectively comprise an air duct.

12. The improved system for removing heat according to claim 1, wherein said cabin air exhaust outlet is arranged at a top of said cabin.

13. The improved system for removing heat according to claim 1, wherein said expansion turbine is arranged within a wing root of said wing, and wherein said first air channel outlet opens through said fuselage outer skin within said wing root.

14. The improved system for removing heat according to claim 1, comprising a plurality of said expansion turbines and a plurality of said first air channels respectively connected to each other.

15. The improved system for removing heat according to claim 14, further comprising a plurality of filters interposed respectively between said first air channels and said expansion turbines.

16. The improved system for removing heat according to claim 1, further comprising an electrical generator coupled to an output shaft of said expansion turbine.

17. The improved system for removing heat according to claim 1, wherein said second air channel outlet opens overboard said aircraft into an outside environment surrounding said aircraft.

18. The improved system for removing heat according to claim 1, wherein said aircraft further includes a jet engine with a compressed air bleed tap, and wherein said system further comprises a bleed air cooler with a first flow passage connected to said compressed air bleed tap and a second flow passage connected to said second air channel outlet.

19. The improved system for removing heat according to claim 1, further comprising a third air channel arranged in said wing along a bottom of said wing and having a third air channel inlet and a third air channel outlet, and a second expansion turbine interposed between said second air channel outlet and said third air channel inlet.

20. A method of using the improved system for removing heat according to claim 1, comprising (a) passing said airflow from said cabin through said cabin air exhaust outlet and then through said first air channel wherein said airflow absorbs heat from said fuselage outer skin to form a heated airflow;

(b) passing said heated airflow through said expansion turbine, wherein said heated airflow is expanded and cooled to form an expanded and cooled airflow; and (c) passing said expanded and cooled airflow through said second air channel, wherein said expanded and cooled airflow absorbs heat from said bottom of said wing to form a reheated airflow.

21. The method of claim 20, wherein said system further includes an air filter interposed between said first air channel outlet and said expansion turbine air inlet, and wherein said method further comprises filtering said heated airflow through said air filter between said stage (a) and (b).

22. The method of claim 20, further comprising, after said step (c), another step of expanding and cooling said reheated airflow to form a recooled airflow, and then absorbing additional heat into said recooled airflow from said bottom of said wing.

\* \* \* \* \*

UNITED STATES PATENT AND TRADEMARK OFFICE
CERTIFICATE OF CORRECTION

PATENT NO.  : 5,794,888
DATED       : 12/09/98
INVENTOR(S) : Lutzer

It is certified that error appears in the above-identified patent and that said Letters Patent is hereby corrected as shown below:

Col. 4, line 15, after "airflow"*replace "id" by --6'--; (*second occurrence)
       line 18, after "cooled" insert --16, 17, 18, 19--;
       line 19, after "is" replace "paused" by --passed--;
       line 28, after "formed" insert --by the--, after "the" replace "wings" by --wing,--;
       line 30, before "or" replace "pan" by --parts--.

Col. 5, line 11, after "and" (first occurrence) replace "$\dot{m}_2 = 1.45$ kg/m" by --$\dot{m}_2 = 1.45$ kg/s--;
       line 21, after "whereby" replace "$\Delta T = (80 - S)\,°C. = 75$" by --$\Delta T = (80 - 5)\,°C. = 75$";
       line 35, before "so" replace "$\Delta T = 525K,$" by --$\Delta T = 52.5K,$--;
       line 44, after "the" (second occurrence) replace "wing." by --wings.--.

Col. 7, line 23, after "channel" insert --,--.

Signed and Sealed this

Nineteenth Day of January, 1999

Attest:

Attesting Officer

*Acting Commissioner of Patents and Trademarks*

UNITED STATES PATENT AND TRADEMARK OFFICE
CERTIFICATE OF CORRECTION

PATENT NO. : 5,794,888
DATED : August 18, 1998
INVENTOR(S) : Lutzer

It is certified that error appears in the above-identified patent and that said Letters Patent is hereby corrected as shown below:

Col. 4, line 15, after "airflow"*replace "id" by --6'--; (*second occurrence)
line 18, after "cooled" insert --16, 17, 18, 19--;
line 19, after "is" replace "paused" by --passed--;
line 28, after "formed" insert --by the--, after "the" replace "wings" by --wing,--;
line 30, before "or" replace "pan" by --parts--.

Col. 5, line 11, after "and" (first occurrence) replace "$\dot{m}_2 = 1.45$ kg/m" by --$\dot{m}_2 = 1.45$ kg/s--;
line 21, after "whereby" replace "$\Delta T = (80 - S) °C. = 75$" by --$\Delta T = (80 - 5) °C. = 75$";
line 35, before "so" replace "$\Delta T = 525K$," by --$\Delta T = 52.5K$,--;
line 44, after "the" (second occurrence) replace "wing." by --wings.--.

Col. 7, line 23, after "channel" insert --,--.

This certificate supersedes Certificate of Correction issued January 19, 1999.

Signed and Sealed this

Seventh Day of September, 1999

Attest:

Q. TODD DICKINSON

*Attesting Officer*     *Acting Commissioner of Patents and Trademarks*